UNITED STATES PATENT OFFICE 2,453,619

1,3-DIKETONES

Alva C. Byrns, Los Altos, Calif., assignor to Union Oil Company of California, Los Angeles, Calif., a corporation of California No Drawing. Application August 2, 1944, Serial No. 547,807

10 Claims. (Cl. 260—586)

This invention relates to a process for producing 1,3-diketones and is a continuation in part of my copending application, Serial No. 392,095, filed May 6, 1941, which issued as Patent No. 2,355,703 on August 15, 1944. The invention applies particularly to a method for preparing olefinic diketones of cyclic or acyclic character by a method involving the reaction of a suitable olefin with diketene in the presence of an acylation catalyst. These materials are useful as solvents, chemical intermediates, ingredients in perfumes, additives for motor fuels, and like uses.

1,3-diketones or beta diketones of aromatic type have been prepared in the past by a Friedel and Crafts type reaction between aromatic hydrocarbons and diketene in the presence of aluminum chloride. In this reaction the aluminum chloride is not, strictly speaking, a catalyst, since much of it enters into the reaction and is decomposed with the formation of hydrogen chloride. Thus it is necessary to employ at least 2 mols of aluminum chloride for each mol of diketene which is reacted. Apparently milder catalysts such as zinc chloride, will not effect this reaction.

As far as is known, unsaturated diketones of non-aromatic nature have not been prepared by the above method or any other method of comparable simplicity. It has now been found, however, that such diketones may be prepared by a method which resembles in some respects the above method for making aromatic diketones in that diketene is employed as a reactant, but differs from the above method in that mild acylation catalysts such as zinc chloride and sulfuric acid are employed in relatively small quantities as true catalysts and no hydrogen chloride is evolved. In this process either cyclo-olefins or acyclic olefins, preferably of branched chain type, may be used. The following are typical equations illustrating the reactions when diisobutylene and cyclohexene, respectively, are employed as the olefins. These products, as described in Examples 1 and 2, are new compositions of matter.

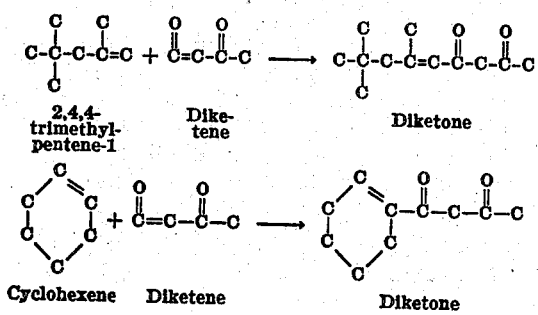

Commercial diisobutylene contains other isomers which also react, but the above isomer is believed to constitute the major proportion. In all structural formulas employed herein, the hydrogen atoms are omitted for the sake of brevity and clarity, but it is to be understood that enough hydrogens are present to satisfy the valence of 4 for each carbon.

The above reactions will take place at a temperature in the neighborhood of 100° F. Temperatures greater than 200° F. are seldom necessary and frequently undesirable because of the tendency to form tarry products of side reactions. Temperatures below 100° F. may be employed, down to about 0° F. or below, but the reaction rate at these lower temperatures is reduced.

Diketene is an industrial chemical which has been thoroughly described in a publication by A. B. Boese, Jr., in the January 1940 edition of Industrial and Engineering Chemistry, vol. 32, page 16. Four structural formulas have been proposed for this material as follows:

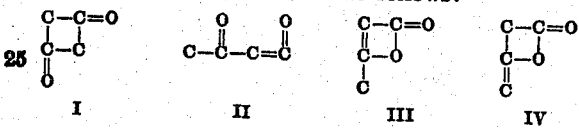

For brevity herein Formula II will be employed although it is realized that according to the above article Formula IV appears to be more likely. As described in the above article diketene is a colorless non-hygroscopic liquid insoluble in water but soluble in the common organic liquid solvents. It has an intensely pungent odor and its vapors are extremely lachrymatory. Its specific gravity is about 1.09, its boiling point about 127° C. and its melting point about —6° C.

The olefins which are reacted with the above diketene to produce the unsaturated diketones of this invention may be either cyclic or acyclic, and preferably contain at least four carbon atoms per molecule. Suitable cyclic olefins are cyclohexene, cyclopentene, methylcyclopentene, ethyl cyclohexene and the like. The acyclic olefins are preferably branched chain in structure such as isobutylene, diisobutylene, 4-methyl pentene-2, 3-phenyl pentene-1 and the like. Particularly suitable olefins are prepared by polymerization of low molecular weight olefins such as propene, butenes and pentenes obtained in the cracking of petroleum. The material known as polymer gasoline, produced by polymerization of cracking plant gases containing such olefins in the presence of catalysts such as phosphoric acid is very suitable. The crude polymer gasoline thus obtained may be employed as obtained or may be distilled to separate fractions of the desired molecular weight, or otherwise purified. The olefins may also be prepared by polymerization of relatively pure olefins such as isobutylene in the presence of a catalyst such as sulfuric acid. Olefins may also be prepared by dehydration of suitable branched chain alcohols or by removal of hydrogen halide from alkyl halides or by other methods described in the art. In general, it is preferred to use normally liquid olefins having at least 5 carbon atoms. Those olefins having less than about 14 carbon atoms are generally preferred, although higher molecular weight olefins such as those obtained from wax, or even wax olefin polymers may be employed.

In order to effect a reaction between diketene and the above olefins it is necessary to employ a catalyst which is a mild acylation catalyst. Concentrated sulfuric acid for example is an excellent catalyst. The sulfuric acid is preferably commercial concentrated acid containing 96 to 99% sulfuric acid although lower and higher concentrations of acid, for example, 94% acid up to 15 to 20% fuming acid or higher may also be employed. Anhydrous zinc chloride is another very suitable catalyst. This catalyst may contain some water up to about 10% but substantially anhydrous zinc chloride is preferred. Hydrogen chloride and boron trifluoride are excellent catalysts. Metal halides are also suitable, especially the chlorides, fluorides and bromides of iron, zinc and mercury, although halides of cobalt, magnesium, and cadmium and other metals similarly closely related to the above may also be employed, i. e., halides of metals of groups 2 and 8 of the periodic table. Halides of antimony and tin may also be employed. Hydrogen halides such as hydrogen chloride and hydrogen bromide may be employed also, either as catalysts or as promoters for use with other catalysts. Concentrated phosphoric acid and the salts of concentrated sulfuric or phosphoric acid including acid salts such as sodium acid sulfate may also be employed as may fluoboric or fluosilicic acids or their salts. The above catalysts may be distended on carriers where possible. Suitable carriers are carbon, metal oxides, especially alumina, silica gel and the like, and porous ceramics such as tile, brick and the like. The amount of catalyst to be employed may vary within wide limits although in general amounts considerably less than the amount of the diketene reactant are preferred. When hydrogen fluoride or boron fluoride are employed it is preferable to mix the reactants, that is, the olefin and the diketene, and contact the mixture with a small amount of the gaseous catalyst. Other modes of operation may be employed however. The temperatures at which the reaction is to be carried out are generally below about 200° F., although temperatures as high as 400° F. or higher may be desirable when employing very mild catalysts such as hydrogen fluoride. If desired, pressures as high as 250 lbs. gage or higher may be employed. Liquid phase operation is preferred, but mixed phase or vapor phase may also be used. The following are specific examples of the process.

Example 1

About 1 mol of diketene and 1 mol of diisobutylene were mixed, and about ½ mol of commercial 95% sulfuric acid was added dropwise to the mixture with vigorous stirring, maintaining the temperature below about 100° F. This order of addition of reagents is generally preferred for those catalysts which are liquids or gases.

After allowing about an hour to complete the reaction, about 500 ml. of water was added to the reaction vessel to dissolve the catalyst from the product. Two liquid phases were formed, the lower aqueous phase containing the catalyst solution and the upper phase containing the crude diketone. The two phases were separated, the oil phase was washed with water and diluted in sodium carbonate solution and distilled under vacuum. The distillate was separated into fractions, one of which consisted largely of unreacted diisobutylene and diketene and another of which consisted of the principal diketone product. This diketone was found to have the formula $C_{12}H_{20}O_2$. Tests indicated that it was unsaturated 1,3-diketone. The bulk of it appeared to have the following structural formula although there appeared to be isomers of similar structure present.

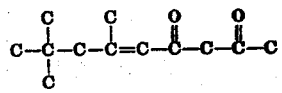

Example 2

Approximately the same preparation as described in Example 1 above was carried out employing cyclohexene in place of the diisobutylene. The diketone obtained had the formula $C_{10}H_{14}O_2$ and appeared to be largely of the following structure:

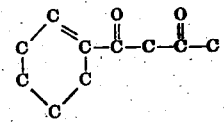

Example 3

The preparation described in Example 1 was repeated employing only about ¼ of the amount of catalyst. The same diketone was obtained in only slightly reduced yield.

Example 4

Approximately 150 grams of anhydrous zinc chloride (technical 94% pure equivalent to one mol) was added to 75 cc. of diketene. The mixture was agitated and the bulk of the zinc chloride dissolved. The mixture was cooled to prevent decomposition, since some heat was evolved. To this mixture was added slowly approximately 150 ml. (about one mol) of commercial diisobutylene. The mixture was cooled to prevent the temperature from exceeding 100° F. A crystalline product gradually separated from the reaction mixture, which proved to be a complex of zinc chloride and the diketone of Example 1. The diketone was separated from this complex by hydrolysis. Additional diketone was also separated from the filtrate.

Example 5

The process of Example 1 was carried out substituting approximately .15 mol of gaseous boron trifluoride for the sulfuric acid. The boron trifluoride was bubbled slowly into the reaction mixture. The same product obtained in the earlier example was obtained, in a slightly lower yield.

By processes similar to those outlined above analogous ketones were prepared in the presence of these and other catalysts described above, from other cyclic olefins such as methyl cyclopentene and other acyclic branched chain olefins such as a mixture of olefin polymers boiling in the gasoline range obtained from a commercial polymerization plant operating on a mixed butane-butene feed and employing a phosphoric acid catalyst.

It was also found possible to employ straight chain olefins such as pentene-1, normal octane and the like, but the yields were much lower.

The foregoing examples are not to be considered as limiting the invention. Modifications which would occur to one skilled in the art may be employed without departing from the spirit thereof and these are to be considered within the scope of invention as defined in the following claims.

I claim:

1. A process for the preparation of 1,3-diketones which comprises reacting a mono-olefin with diketene in the presence of an acylation catalyst.

2. A process according to claim 1 in which the olefin is a cyclic olefin containing at least 4 carbon atoms.

3. A process according to claim 1 in which the olefin is an acyclic branched chain olefin containing at least 4 carbon atoms.

4. A process according to claim 1 in which the acylation catalyst is zinc chloride.

5. A process according to claim 1 in which the acylation catalyst is concentrated sulfuric acid.

6. A process according to claim 1 in which the acylation catalyst is boron trifluoride.

7. An unsaturated 1,3-diketone having the following structure:

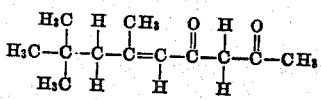

8. An unsaturated 1,3-diketone having the following structure:

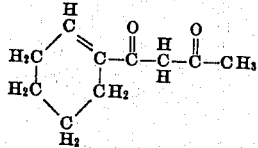

9. An unsaturated 1,3-diketone mixture of isomers having the formula $C_{12}H_{20}O_2$, said diketone mixture having been prepared by reacting diisobutylene with diketene in the presence of concentrated sulfuric acid at a temperature not greater than about 100° F.

10. An unsaturated 1,3-diketone mixture of isomers having the formula $C_{10}H_{14}O_2$, said diketone mixture having been prepared by reacting cyclohexene with diketene in the presence of concentrated sulfuric acid at a temperature below about 100° F.

ALVA C. BYRNS.

REFERENCES CITED

The following references are of record in the file of this patent:

UNITED STATES PATENTS

| Number | Name | Date |
|---|---|---|
| 2,214,117 | Boese | Sept. 10, 1940 |

OTHER REFERENCES

Brooks, "Jour. Am. Chem. Soc.," vol. 63, pages 870–1 (1941).